(12) United States Patent
Kördel et al.

(10) Patent No.: US 10,882,152 B2
(45) Date of Patent: Jan. 5, 2021

(54) MOUNTING TOOL FOR GROOVED PIECES

(71) Applicant: Siemens Aktiengesellschaft, Munich (DE)

(72) Inventors: Martin Kördel, Charlotte, NC (US); Helmuth Euler, Glonn (DE); Anton Schick, Velden (DE); Wolfgang Heine, Unterhaching (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 143 days.

(21) Appl. No.: 16/088,985

(22) PCT Filed: Dec. 7, 2016

(86) PCT No.: PCT/EP2016/080007
§ 371 (c)(1),
(2) Date: Sep. 27, 2018

(87) PCT Pub. No.: WO2017/167412
PCT Pub. Date: Oct. 5, 2017

(65) Prior Publication Data
US 2019/0126419 A1    May 2, 2019

(30) Foreign Application Priority Data
Mar. 30, 2016 (DE) .......................... 10 2016 205 222

(51) Int. Cl.
*B23Q 9/00* (2006.01)
*B23Q 9/02* (2006.01)
(Continued)

(52) U.S. Cl.
CPC ............ *B23Q 9/0014* (2013.01); *B23P 6/002* (2013.01); *B23Q 9/02* (2013.01); *F01D 5/005* (2013.01);
(Continued)

(58) Field of Classification Search
CPC ... B23Q 1/03; B23Q 1/25; B23Q 1/28; B23Q 1/70; B23Q 3/00; B23Q 3/06; B23P 11/00; B23P 19/04
See application file for complete search history.

(56) References Cited

U.S. PATENT DOCUMENTS 5,056,766 A * 10/1991 Engibarov ................ B25B 1/08
                                                        269/101
5,608,970 A *  3/1997 Owen .................. B23Q 1/0063
                                                        269/303
(Continued)

FOREIGN PATENT DOCUMENTS

DE           885 001 C    8/1953   ............... B23Q 9/00
DE   10 2008 000 480 A1  9/2009   ............... B23C 3/28
(Continued)

OTHER PUBLICATIONS

International Search Report and Written Opinion, Application No. PCT/EP2016/080007, 15 pages, dated May 10, 2017.

*Primary Examiner* — Lee D Wilson
(74) *Attorney, Agent, or Firm* — Slayden Grubert Beard PLLC

(57) ABSTRACT

Various embodiments include a structure for positioning a tool on an elongated recess of a workpiece, wherein the elongated recess extends along a first longitudinal axis and has end surfaces on two end faces. The structure may include a plate having a cutout extending along an axis; a centering device; and a clamping device fixedly connected to the plate and the centering device. The cutout, when the second longitudinal axis is aligned parallel to the first longitudinal axis, enframes the elongated recess. The centering device includes a centering jaw movable within the cutout along the second longitudinal axis and also movable into and out of the elongated recess. The clamping device, on the side of the plate facing the elongated recess, includes clamping jaws (Continued)

movable along the second longitudinal axis to come into mechanical contact with one of the end surfaces of the end faces of the elongated recess.

9 Claims, 4 Drawing Sheets

(51) Int. Cl.
  *F01D 5/00* (2006.01)
  *F01D 5/30* (2006.01)
  *F01D 25/28* (2006.01)
  *B23P 6/00* (2006.01)

(52) U.S. Cl.
  CPC ............. *F01D 5/30* (2013.01); *F01D 25/285* (2013.01); *F05D 2230/80* (2013.01)

(56) References Cited

U.S. PATENT DOCUMENTS

| | | | |
|---|---|---|---|
| 8,678,363 B2 * | 3/2014 | Baker ................. | B25B 1/103 269/45 |
| 2014/0167369 A1 * | 6/2014 | Zeng ................. | B23B 31/10 279/126 |
| 2014/0223709 A1 | 8/2014 | Clark et al. ................. | 29/23.51 |
| 2019/0126419 A1 * | 5/2019 | Kordel ................. | B23P 6/002 |

FOREIGN PATENT DOCUMENTS

| | | | | |
|---|---|---|---|---|
| EP | 0 486 131 A2 | 5/1992 | ............. | B23B 47/28 |
| EP | 1 568 439 A1 | 8/2005 | ............... | B23P 6/00 |
| WO | 2017/167412 A1 | 10/2017 | ............... | B23P 6/00 |

* cited by examiner

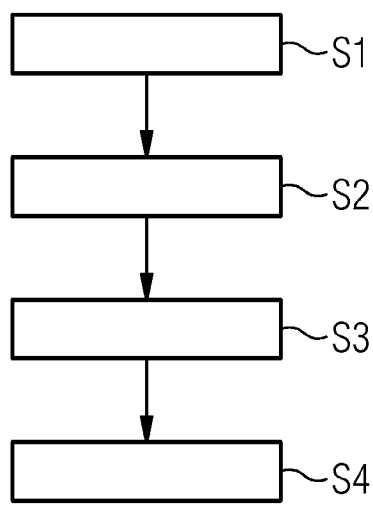

MOUNTING TOOL FOR GROOVED PIECES

CROSS-REFERENCE TO RELATED APPLICATIONS

This application is a U.S. National Stage Application of International Application No. PCT/EP2016/080007 filed Dec. 7, 2016, which designates the United States of America, and claims priority to DE Application No. 10 2016 205 222.5 filed Mar. 30, 2016, the contents of which are hereby incorporated by reference in their entirety.

TECHNICAL FIELD

The teachings herein relate to machining and fabricating. Various embodiments may include a structure for the positioning and fastening of a tool, which can be fastened on the structure, on an elongated recess, especially a groove, especially of a rotor, especially of a gas turbine rotor, which extends spatially along a first longitudinal axis.

BACKGROUND

For inspection, for dimensional measurement, for machining, and for maintenance of gas turbine rotor grooves, especially rectilinear grooves, different tools are required. In order to operate these tools in the grooves, these have to be positioned and fastened relative to the groove. Individual models are conventionally used as tools. These are not fastened and manually positioned on the groove and the rotor.

SUMMARY

The teachings of the present disclosure may enable machining of an elongated recess, especially a groove, especially of a turbine rotor, using a multiplicity of different tools in a simple, inexpensive, effective, reliable and accurate manner. A tool is to be able to be positioned and fastened securely and accurately relative to the groove. A recess is especially a spatial area of a material body in which no material of the body is present.

As an example, some embodiments may include a structure (A) for the positioning and fastening of a tool, which can be fastened on the structure, on an elongated recess, especially a groove (N), especially of a rotor, which extends spatially along a first longitudinal axis (L1) and on two end faces (S1, S2) has end surfaces, characterized in that the structure has a plate (3), which has a cutout which extends spatially along a second longitudinal axis (L2) and can be aligned with this parallel to the first longitudinal axis, and enframes the elongated recess, which plated is fixedly connected to a centering device and to a clamping device; wherein the centering device (1) has at least one centering jaw (2) which can be moved in the cutout along the second longitudinal axis and into and out of the elongated recess; wherein the clamping device (5), on the side of the plate facing the elongated recess, has clamping jaws (6) which can be moved in each case along the second longitudinal axis and brought into mechanical contact with, and releasably fastened to, one of the end surfaces of the end faces of the elongated recess.

In some embodiments, the centering jaw (2) extends spatially in a cross section to the second longitudinal axis beyond the extent of the elongated recess in a cross section to the first longitudinal axis and can be clamped in the elongated recess.

In some embodiments, the centering jaw (2) has the shape of a wedge, a cone, a truncated cone, a semi-sphere or a parallelepiped and especially consists of plastic.

In some embodiments, the centering jaw (2) can be moved perpendicularly to the plate or from one of the end faces of the first longitudinal axis into and out of the elongated recess.

In some embodiments, two centering jaws, creating wedges which correspond to an opening angle of the elongated recess, and four clamping jaws are created.

In some embodiments, the elongated cutout extends spatially along the second longitudinal axis beyond the length of the elongated recess along the first longitudinal axis in such a way that the centering jaw(s) can be moved out of the elongated recess and along the second longitudinal axis beyond the end surface(s) outside the elongated recess.

In some embodiments, the spacing of two clamping jaws on two end faces is greater than the length of the elongated recess.

In some embodiments, the mechanical contact of the clamping jaws with the end faces of the elongated recess is created by means of mechanical pressure or magnetic force.

In some embodiments, the clamping jaws can be rotatably adjusted around a vertical to the plate for adapting to an angle between the first longitudinal axis and a third longitudinal axis (L3) of a rotor shaft.

As another example, some embodiments may include a method for the positioning and fastening of a tool, which can be fastened on the structure which is created as claimed in one of the preceding claims, on an elongated recess, especially a groove, especially of a rotor, which extends spatially along a first longitudinal axis and on two end faces has four end surfaces, with the steps (ST1) moving the centering jaws of the centering device into the elongated recess; (ST2) moving the clamping jaws of the clamping device in each case along the second longitudinal axis and bringing the clamping jaws into mechanical contact in each case with one of the especially four end surfaces of the two end faces of the elongated recess and fastening the clamping jaws on the end surfaces.

In some embodiments, the method includes rotation of the clamping jaws around a vertical to the plate, carried out during the moving and/or contacting, for adapting to an angle between the first longitudinal axis and a third longitudinal axis of a rotor shaft.

In some embodiments, the method includes (ST4) movement of the centering jaw(s), perpendicularly to the plate, out of the elongated recess and along the second longitudinal axis beyond the end surface(s) outside the groove.

In some embodiments, the method includes (ST4) movement of the centering jaw(s) out of the end faces of the elongated recess.

BRIEF DESCRIPTION OF THE DRAWINGS

The teachings of the present disclosure are described in more detail based on exemplary embodiments in conjunction with the figures. In the drawings:

FIG. 7 shows an exemplary embodiment of a method according to the teachings of the present disclosure.

DETAILED DESCRIPTION

Figure 1:
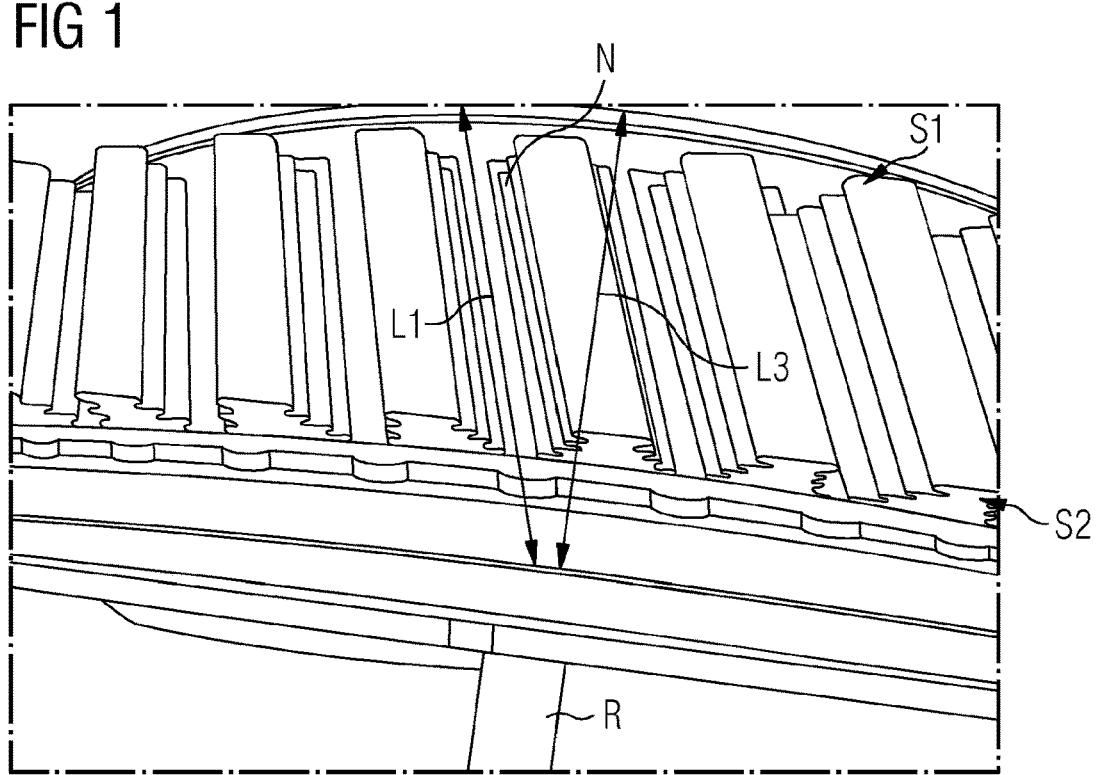
FIG. 1 shows a view of a conventional rotor.

Various embodiments may include a structure for the positioning and fastening of a tool, which can be fastened on the structure, on an elongated recess, especially a groove, especially of a rotor, which extends spatially along a first longitudinal axis and on two end faces has especially four end surfaces, wherein the structure has a plate, having a cutout which extends spatially along a second longitudinal axis and can be aligned with this parallel to the first longitudinal axis, and enframes the elongated recess, for example the groove, which plate is fixedly connected to a centering device and to a clamping device, wherein the centering device has at least one centering jaw which can move in the cutout along the second longitudinal axis and into and out of the elongated recess, wherein the clamping device, on the side of the plate facing the elongated recess, has clamping jaws which in each case can move along the second longitudinal axis and mechanically brought into contact with, and releasably fastened to, one of the end surfaces of the two end faces of the elongated recess.

A cutout refers to a spatial area of a material body in which no material of the body is present. The cutout can be created as a continuous opening.

In some embodiments, a machining structure for elongated recesses, especially grooves, especially for gas turbine rotor grooves, is proposed as a mechanical basis for the use of different tools. In some embodiments, this machining structure includes a centering device and a clamping device.

In some embodiments, a method for the positioning and fastening of a tool, which can be fastened on a structure created according to one of the preceding claims, on an elongated recess, especially a groove, especially of a rotor, which extends spatially along a first longitudinal axis and on two end faces has four end surfaces, with the following steps: Moving the centering jaws of the centering device into the groove; and Moving the clamping jaws of the clamping device in each case along the second longitudinal axis and mechanically bringing the clamping jaws into contact in each case with one of the especially four end surfaces of the two end faces of the elongated recess and fastening the clamping jaws on said end surfaces.

In some embodiments, the structure may be compact, portable, modular, and suitable for a large number of tools. It combines all the method steps of centering and clamping along the elongated recess, especially the groove, in one step without requiring any manual fine adjustments. Therefore, tools fastened on the structure are already positioned relative to the elongated recess, to its walls and to the longitudinal axis of the elongated recess. The clamping can be carried out on the front/rear (end) surfaces of the elongated recesses, especially grooves, in such a way that the inner surface of the elongated recess is neither blocked nor damaged. This retains the centering mechanism. This is ideally suitable especially for service applications and for production applications.

In some embodiments, the centering jaw extends spatially in a cross section to the second longitudinal axis beyond the extent of the elongated recess in a cross section to the first longitudinal axis and can be clamped in the elongated recess. A contour of the centering jaw may be larger than that of the recess and is adapted to this especially for a form fit. The centering jaws can taper in cross section in the direction toward the elongated recess. In some embodiments, the centering jaw can have the shape of a wedge, a cone, a truncated cone, a semi-sphere or a parallelepiped and can especially consist of plastic.

In some embodiments, the centering jaw can be movable perpendicularly to the plate or from one of the end faces of the first longitudinal axis into and out of the elongated recess.

In some embodiments, two centering jaws, creating wedges forming an opening angle of the elongated recess, and four clamping jaws can be created. By means of two wedges, centering along the first longitudinal axis is effectively simplified. Two wedges are can also be removed in a simple manner.

In some embodiments, the elongated cutout can extend spatially along the second longitudinal axis spatially beyond the length of the elongated recess along the first longitudinal axis in such a way that the centering jaw(s) can be moved out of the elongated recess and along the second longitudinal axis beyond the end surface(s) outside the elongated recess. In embodiments with two wedges, these can be moved in a simple manner beyond the two end surfaces outside the elongated recess.

In some embodiments, the spacing of two clamping jaws on two end faces can be greater than the length of the elongated recess. In this way, clamping jaws can be pressed against end faces in a simple manner.

In some embodiments, the mechanical contact of the clamping jaws with the end faces of the elongated recess can be created by means of mechanical pressure or magnetic force.

In some embodiments, the clamping jaws can be rotatably adjustable around a vertical to the plate for adapting to an angle between the first longitudinal axis and a third longitudinal axis of a rotor shaft. In this way, the clamping device allows compensation of shear forces by means of installing rotatably finely adjustable clamping jaws. In some embodiments, a rotating of the clamping jaws can be carried out around a vertical to the plate for adapting to an angle between the first longitudinal axis and a third longitudinal axis of a rotor shaft.

In some embodiments, a movement of the centering jaw(s) perpendicularly to the plate out of the elongated recess and along the second longitudinal axis beyond the end surface(s) outside the elongated recess can be carried out. In this way, the centering jaws can be removed from a working area of a tool or from the region of the elongated recess.

In some embodiments, a movement of the centering jaw(s) out of the end faces of the elongated recess can be carried out.

FIG. 1 shows a view of a conventional gas turbine rotor. This has a multiplicity of grooves N. In this case, a groove N extends along a first longitudinal axis L1. Each groove has altogether four end surfaces on two end faces S1 and S2. The plan view shows that a groove N has an opening angle by which a groove N widens radially toward a rotor shaft R. FIG. 1 shows how the rotor shaft R extends spatially along a third longitudinal axis L3. FIG. 1 shows that an angle is formed between the first longitudinal axis L1 and the third longitudinal axis L3.

Figure 2:
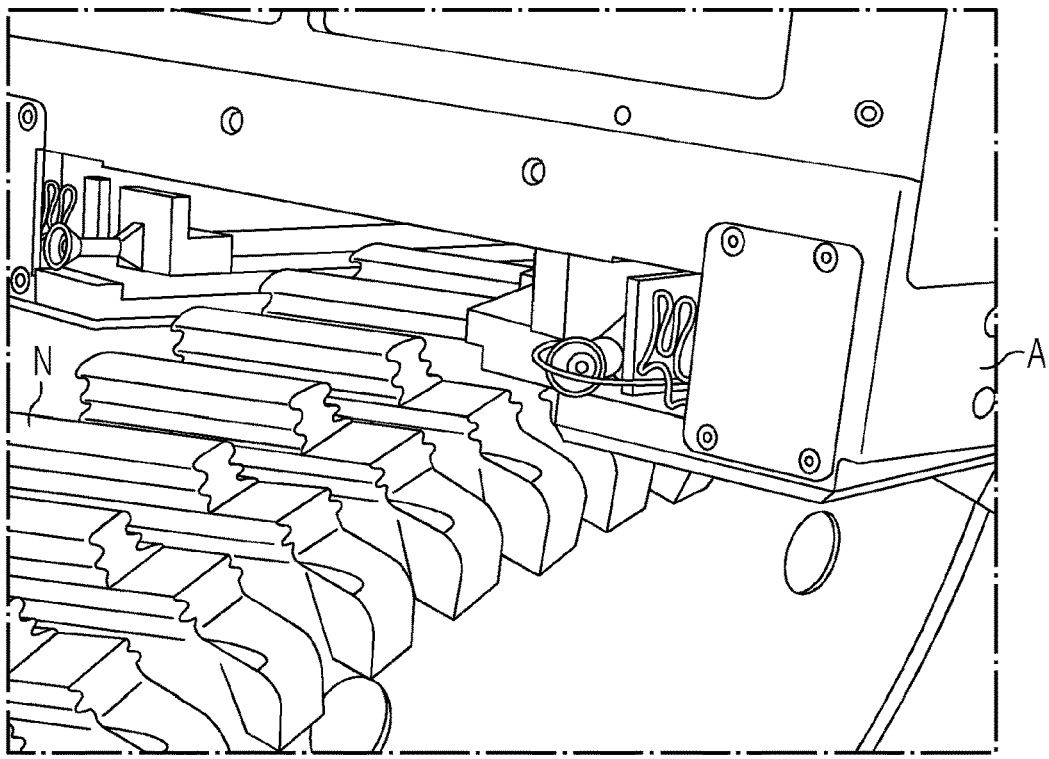
FIG. 2 shows a first view of a structure according to the teachings of the present disclosure.

FIG. 2 shows a first view of an example embodiment of a structure incorporating the teachings herein. The structure A can also be referred to as a platform. By the same token, this platform can also be referred to as a tooling platform for supporting any kind of tool. This provides a defined and stable fastening for example on a gas turbine groove N for a wide variety of tools, such as a measuring head or a miller. The structure A in a first approach is a frame, encompassing the groove N, which is fixedly connected to the subsequently described centering device 1 and clamping device 5.

Figure 3:
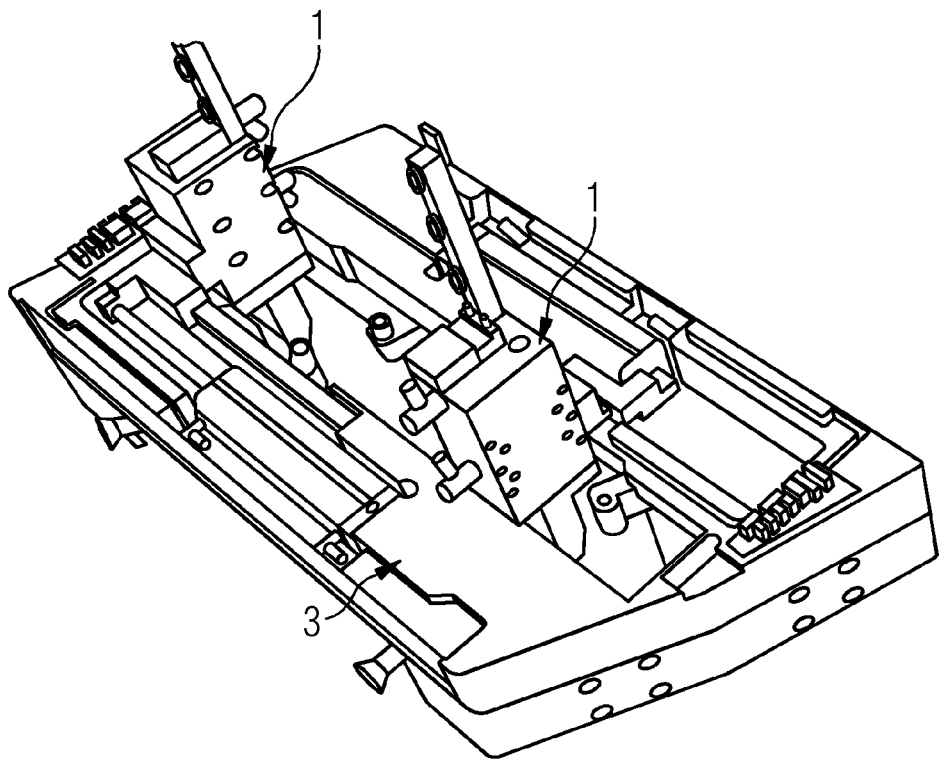
FIG. 3 shows a second view of a structure according to the teachings of the present disclosure.

FIG. 3 shows a second view of an example embodiment of a structure incorporating the teachings herein. FIG. 3 shows the centering device 1 which can also be referred to as a centering mechanism. The centering mechanism serves for aligning the structure A or the platform along the axis, especially the first longitudinal axis L1, of a respective elongated recess which for example can be a groove N. A structure according to the invention can for example also be attached on gaps. As shown, this embodiment consists of two movable centering jaws 2 which in this case are for example adapted to an opening angle of the grooves N in a wedge-shaped manner.

This enables an immediate centering of the axis, especially of the second longitudinal axis L2, of the platform, which is especially designed as a plate, with the first longitudinal axis L1 which is associated with the groove N. In order to bring about the centering, a perpendicular movement of the centering jaws 2 can be carried out. This can be carried out either by means of movement of the jaws relative to the platform or of the plate, or movement of the entire platform or of the structure A, for example as a consequence of its own weight. The centering can alternatively be carried out by means of introducing the centering jaws 2 from the end faces of the elongated recess. The centering jaws 2, depending on their spatial design, can also be screwed into the elongated recess.

If centering is carried out, clamping has to follow in order to be able to move the centering jaws 2 out of the groove N without the alignment being lost. After clamping has been carried out, the centering jaws 2 have to first of all be moved in the perpendicular or vertical direction out of the groove N and then outward in the direction along the second longitudinal axis L2, which can be a horizontal direction, so that the groove N becomes freely accessible along its entire length.

Figure 4:
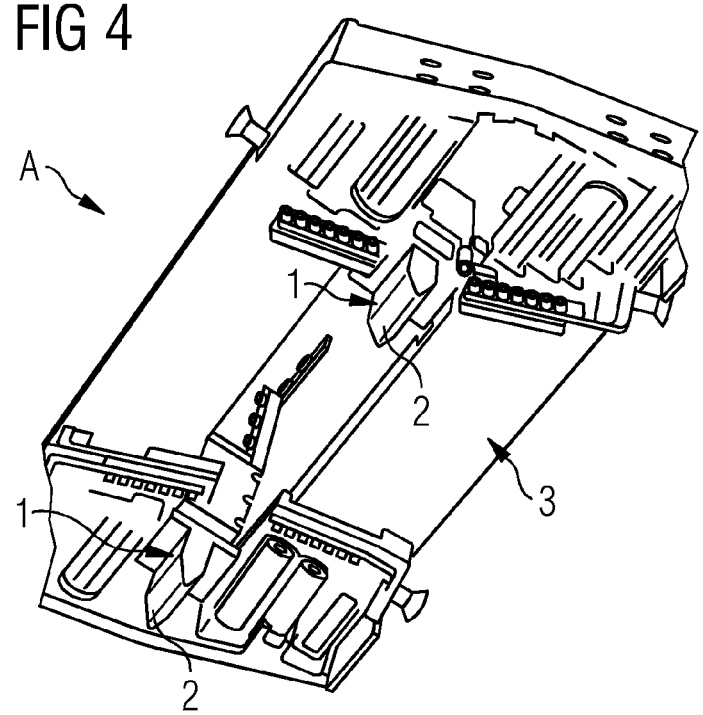
FIG. 4 shows a third view of a structure according to the teachings of the present disclosure.

FIG. 4 shows a third view of an example embodiment of a structure incorporating the teachings herein. FIG. 4 shows a structure A from the side facing the respective grooves N or elongated recesses. FIG. 4 shows the centering jaws 2 which in this case are of wedge-shaped design and by their geometry correspond to an opening angle of the groove so that the centering jaws 2 can center the plate 3 and therefore the structure A. Two centering jaws 2 are advantageously used since in this way a simple aligning of the second longitudinal axis L2 parallel to the first longitudinal axis L1 can be carried out. By the same token, two centering jaws 2 can be moved out of the region of the grooves along the second axis in a simple manner, which is advantageous for optimum accessibility of the tool.

Figure 5:
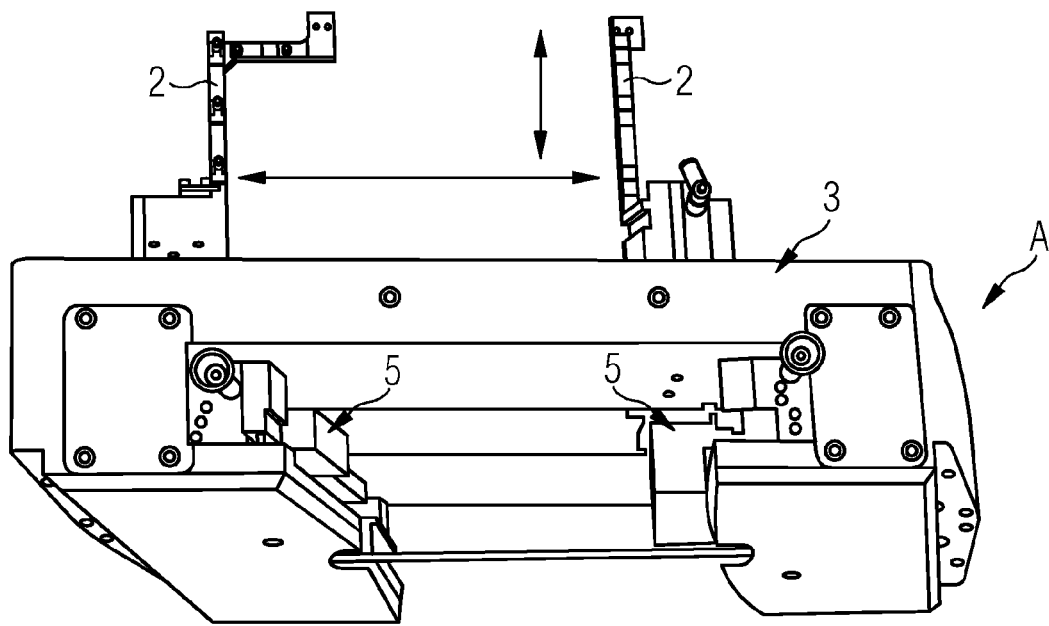
FIG. 5 shows a fourth view of a structure according to the teachings of the present disclosure.

FIG. 5 shows a fourth view of a structure A incorporating the teachings herein. FIG. 5 especially shows the clamping device 5 which serves for mounting the structure A on the end faces S1 and S2 of the respective grooves N. The clamping device 5 according to this embodiment has four clamping jaws 6, specifically two per side S1 and S2, which can move along the second longitudinal axis L2. The structure A has a plate 3 which has a cutout, which extends spatially along a second longitudinal axis L2 and can be aligned with this parallel to the first longitudinal axis L1, and enframes the groove, which plate is fixedly connected to the centering device 1 and to the clamping device 5.

The distance between the clamping jaws 6 from the end face S1 to the end face S2 corresponds to a little more than the length of the groove N along the first longitudinal axis L1. If centering of the platform or of the structure A is carried out, the clamping jaws 6, by means of mechanical contact, for example by means of pressure or magnetic force, with the end face S1 and S2 of the grooves N, ensure the fixing of the structure A on the groove N. Since the grooves N have an angle to the third longitudinal axis L3, which is associated with the turbine shaft, the clamping jaws 6 have jaws which are angularly adjustable. FIG. 5 shows, on an upper side of the structure A, the centering device 1 with two centering jaws 2 which can be moved along the second longitudinal axis L2 and perpendicularly to the plate 3.

Figure 6:
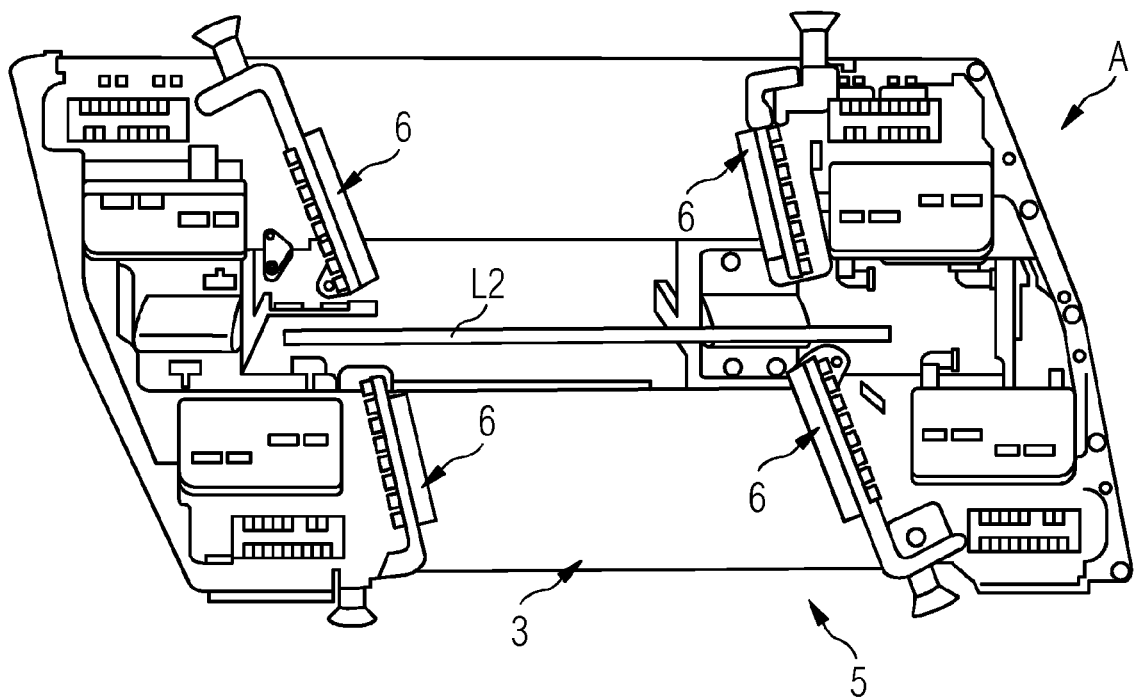
FIG. 6 shows a fifth view of a structure according to the teachings of the present disclosure.

FIG. 6 shows a fifth view of a structure A incorporating the teachings herein. FIG. 6 shows the structure A or the platform from the side facing the respective grooves N. FIG. 6 shows the clamping device 5 which in this case has four clamping jaws 6. These are movable along the second longitudinal axis L2. In addition, the clamping jaws 6 can be angularly adjusted around a vertical which is perpendicular to the plate 3. By means of this angular adjustment it is ensured that no shear forces occur during the clamping. By means of the clamping on the end faces S1 and S2 of the groove N it is ensured that no functional surface is affected as a result of mechanical stress.

FIG. 7 shows an example embodiment of a method incorporating the teachings herein. With a first step ST1, a movement of the centering jaws of the centering device along the second longitudinal axis and perpendicularly to the plate into the groove is carried out. With a second step ST2, a movement of the clamping jaws of the clamping device along the second longitudinal axis in each case and a mechanical contacting with one of the four end surfaces in each case of the two end faces of the groove and a fastening on the end surfaces is carried out, wherein during the second step a rotation of the clamping jaws around a vertical to the plate is carried out for adapting to an angle between the first longitudinal axis and a third longitudinal axis of a rotor shaft. With a final third step ST3, a movement of the centering jaws perpendicularly to the plate out of the groove and along the second longitudinal axis beyond the end surfaces outside the groove is carried out. As a result, a tool is now positioned relative to a groove so that the respective groove can be machined by means of the tool. In this case, the groove is fully accessible to the tool.

The invention claimed is:

1. A structure for the positioning and fastening of a tool on an elongated recess of a workpiece, wherein the elongated recess extends along a first longitudinal axis and has end surfaces on two end faces, the structure comprising:
   a plate having a cutout extending along a second longitudinal axis;
   wherein the cutout, when the second longitudinal axis is aligned parallel to the first longitudinal axis, enframes the elongated recess;
   a centering device; and
   a clamping device fixedly connected to the plate and the centering device;
   wherein the centering device includes a centering jaw movable within the cutout along the second longitudinal axis and also movable into and out of the elongated recess;
   wherein the clamping device, on the side of the plate facing the elongated recess, includes clamping jaws movable along the second longitudinal axis to come into mechanical contact with one of the end surfaces of the end faces of the elongated recess.

2. The structure as claimed in claim 1, wherein the centering jaw extends in cross section defined perpendicular to the second longitudinal axis beyond the extent of the elongated recess perpendicular to the first longitudinal axis.

3. The structure as claimed in claim 1, wherein the centering jaw comprises a wedge, a cone, a truncated cone, a semi-sphere, or a parallelepiped.

4. The structure as claimed in claim 1, wherein the centering jaw can be moved perpendicularly to the plate or from one of the end faces of the first longitudinal axis into and out of the elongated recess.

5. The structure as claimed in claim 1, wherein the two centering jaws create wedges corresponding to an opening angle of the elongated recess.

6. The structure as claimed in claim 1, wherein the elongated cutout extends spatially along the second longitudinal axis beyond the length of the elongated recess along the first longitudinal axis; and
   wherein the centering jaw moves out of the elongated recess and along the second longitudinal axis beyond the end surface outside the elongated recess.

7. The structure as claimed in claim 1, wherein a spacing of two clamping jaws on two end faces is greater than a length of the elongated recess.

8. The structure as claimed in claim 1, wherein mechanical contact of the clamping jaws with the end faces of the elongated recess is created by mechanical pressure and/or magnetic force.

9. The structure as claimed in claim 1, wherein the clamping jaws can be rotatably adjusted around a vertical to the plate for adapting to an angle between the first longitudinal axis and a third longitudinal axis of a rotor shaft.

* * * * *